United States Patent Office 3,827,921
Patented Aug. 6, 1974

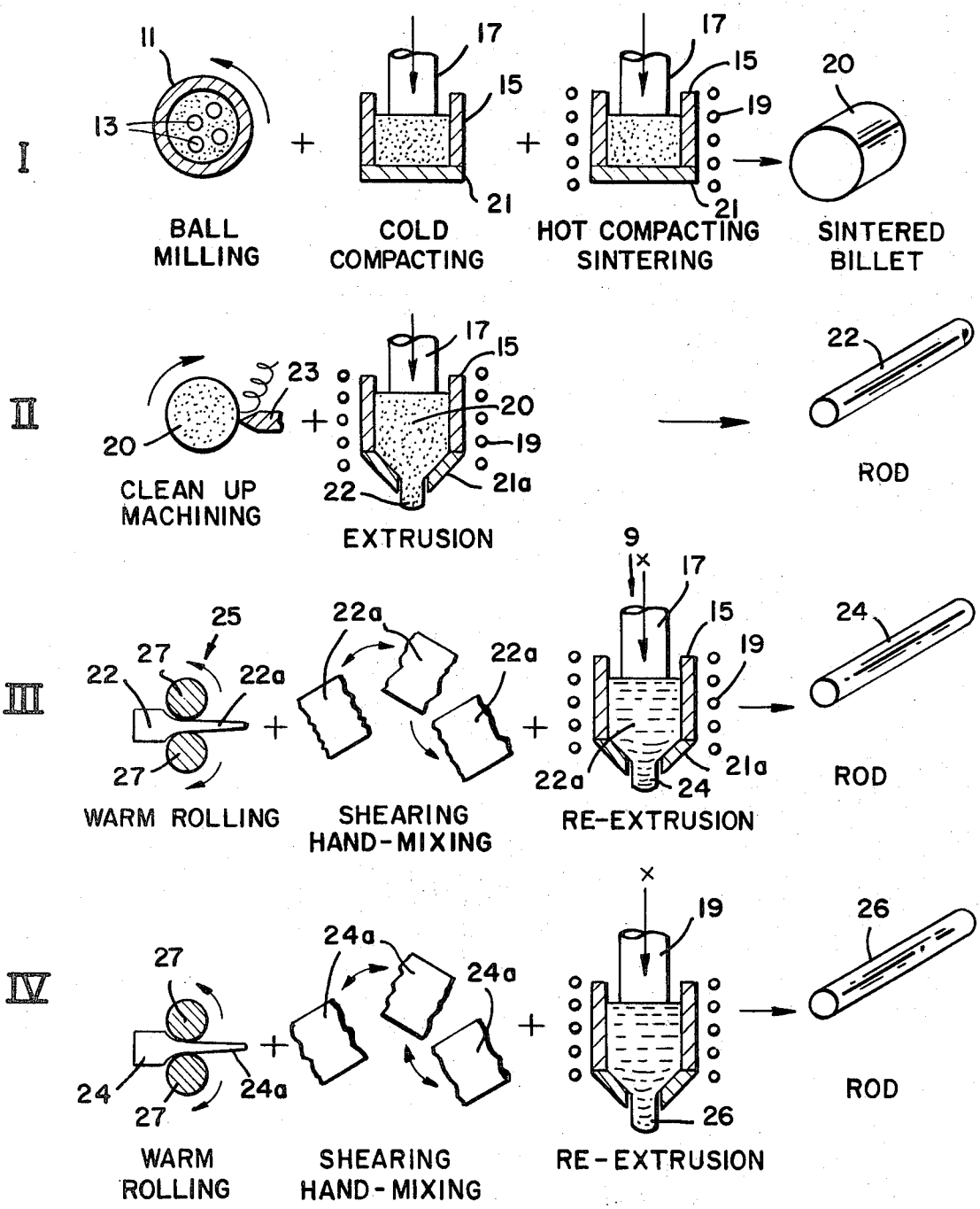

3,827,921
METHOD OF MAKING A COMPOSITE ALLOY
Oleg D. Sherby, Palo Alto, Irvin C. Huseby, Sunnyvale, and Robert Whalen, East Palo Alto, Calif., assignors to the United States of America as represented by the Secretary of the Navy
Continuation of abandoned application Ser. No. 230,396, Feb. 29, 1972. This application Feb. 26, 1973, Ser. No. 355,268
Int. Cl. C22f 1/04
U.S. Cl. 148—11.5 R                    1 Claim

ABSTRACT OF THE DISCLOSURE

A magnesium-boron composite is made by mechanically mixing magnesium powders with about twenty-five percent by volume boron powders. The mixed powders are processed by cold pressing, hot pressing, sintering, extruding, rolling, re-extruding, re-rolling, and re-extruding again.

---

This application is a continuation of patent application S.N. 230,396 filed Feb. 29, 1972 by Oleg D. Sherby, Irvin C. Huseby and Robert Whalen, now abandoned.

BACKGROUND OF THE INVENTION

Field of the Invention

The present invention relates generally to a magnesium-boron composite, and more particularly, to the method of making magnesium-boron composites by mechanically mixing magnesium powders with about twenty-five percent by volume boron powders. The mixed powders are processed by cold pressing, hot pressing, sintering, extruding, rolling, re-extruding, re-rolling, and re-extruding again. The above mixing method includes layering of the rolled mixture before each re-extruding step.

Description of the Prior Art

The ratio of elastic modulus E over the density $p$, known as specific stiffness $E/p$, hereinafter referred to as $E/p$, is a very important design criterion for many structural components such as I-beams, and the like. Materials with high $E/p$ values are especially useful in aero-space applications where stiff materials with low densities are needed.

Most structural materials, for example steel, aluminum, nickel, titanium, magnesium and their alloys, have roughly the same $E/p$ values of about $100 \times 10^6$ in. It should be noted that among these materials the density tends to increase as the elastic modulus E increases, yielding approximately constant $E/p$ values. For example, although the elastic modulus E of steel is 4.8 times that of Magnesium (Mg), the density of steel is about 4.5 times that of Magnesium (Mg). There are relatively few ways of increasing the elastic stiffness for a material. Since modulus varies with orientation in a single crystal, one method is to produce a specific orientation for most of the grains in a polycrystalline material. This will yield an anisotropic material, that is, E will be high in some direction but low in other directions. Such a material may be undesirable in some design applications.

SUMMARY OF THE INVENTION

Briefly, the present invention is a magnesium-boron composite and is made by mechanically mixing magnesium powder with about twenty-five percent by volume boron powders. The mixed powders are then cold pressed, hot pressed, sintered, extruded, rolled, re-extruded, re-rolled and finally re-extruded. The new product of the unique method will overcome the aforementioned problems. The unique method of making the completely new alloy includes layering of the rolled mixture before each re-extruding step which results in a composite alloy with an isotropic specific stiffness of about one and one-half times of any other known magnesium alloy.

STATEMENT OF THE OBJECTS OF INVENTION

The primary object of the present invention is to make a completely new alloy.

Another object of the present invention is to illustrate a unique method of producing a new alloy.

Another object of the present invention is to make a new alloy with a specific stiffness of about one and one-half times that of any other known magnesium alloy.

Other objects and features will be apparent from the accompanying drawing in which the sole figure is a flow diagram of the method for making the magnesium-boron composites.

DESCRIPTION OF THE PREFERRED EMBODIMENTS

The magnesium-boron composites are made by mechanically mixing magnesium powder with about twenty-five percent by volume boron powders. The mixed powders are then cold pressed, hot pressed, sintered, extruded, rolled, and re-extruded. This unique process will be described in conjunction with Example I of the magnesium-boron composite. Magnesium powder such as 100 mesh or RMC–100 mesh produced by Read Manufacturing Company, or the like, can be used. A boron powder of about or smaller than 325 mesh size can be used.

A specific example of the magnesium-boron composite, which was made in accordance with the present invention, is described below.

EXAMPLE I

|  | Percent |
|---|---|
| Magnesium (Mg) | 75 |
| Boron (B) | 25 |

The percentages of boron (B) and magnesium (Mg) are by volume.

The method employed for mechanically mixing the 75% magnesium (Mg) powder and the 25% boron (B) powder consists of four stages:

Referring to the flow diagram in stage I, the magnesium (Mg) and boron (B) powders were mixed by ball milling in a standard cylindrical ball mill container 11. Small alundum griding spheres 13 are added to facilitate proper mixing. Next, the mixed magnesium (Mg) and boron (B) powders are compacted, sintered and extruded. The compacting, sintering and extruding are all done in a steel cylinder 15. The dimensions of cylinder 15 are of about 1.25 inches in diameter and about six inches in length. Cylinder 15 includes a bottom blank plug 21 which can be removed and replaced with extrusion die 21a. Pressure is applied to piston 17 with a 60,000 pound capacity Reihle Universal testing machine or a similar apparatus. The loose mixed magnesium (Mg) and boron (B) powders are placed into cylinder 15 and cold compacted to about 35 k.s.i. and then hot compacted by activating heating device 19. The cold compacted mixture of magnesium (Mg) and boron (B) is heated to about 620° C. and sintered for about thirty minutes. Finally, a 40 k.s.i. pressure is applied for about five minutes to complete stage I. The resultant product is applied for about five minutes to complete stage I. The resultant product is sintered billet 20. The sintered billet 20 is then removed from cylinder 15 and cooled.

In stage II billet 20 is cooled further, then machined by lathe 23 until the entire surface of sintered billet 20 has a uniform nonporous appearance. The sintered clean billet 20 is then placed back into cylinder 15 of extrusion assembly 9. The bottom blank plug 21 is replaced by extrusion die 21a. Die 21a has a minimum aperture diameter of about 0.277 inches. The billet 20 is then extruded at a temperature of about 620° C. and at a rate of about 20 inches per minute, with no lubrication, to form rod 22. This completes stage II.

In stage III rod 22, from the first extrusion of stage II, is heated to about 400° C. by an external heating means and then rolled into strips 22a of about 0.01 inches thick with rolling device 25. Rollers 27 of rolling device 25 are not heated. The rolled strips 22a are edge-cracked and fragmented. As the final thickness of 0.01 inches is approached, several pieces of about one inch wide and about three inches long typify the product to be mixed and re-extruded. The rolled fragments 22a are mixed by hand and placed back into extrusion assembly 9. The mixed fragments 22a are cold packed to about 35 k.s.i. and then re-extruded at a temperature of about 620° C. to form rod 24. This completes phase III. It should be noted that the mixed fragments 22a naturally orient, under pressure, with their flat surfaces prependicular to the extrusion axis X. Thus, the extrusion direction for this second extrusion is perpendicular to the original extrusion axis in each small fragment 22a so that with the second extrusion a very turbulent mixing occurs to give better homogeneity of the alloy which has been shown by standard optical methods.

In stage IV rod 24, as in stage III, is heated to a temperature of about 400° C. and again warm rolled, as in stage III, into 0.01 inch thick strips 24a. Strips 24a are again mixed by hand and placed into extrusion apparatus 9 and extruded for a third time at about 40 k.s.i. into the final 0.277 inch rod 26. In this case, rod 26 (Example I) was tested in an Instron Machine, Marshall Furnace, and a special compression apparatus at temperatures varying from about 24° C. to about 430° C. A compression sample of 0.300 in. in length by 0.277 in. in diameter was ground from rod 26. An elastic modulus E Value of about $11.3 \times 10^6$ p.s.i. was obtained for the composite alloy of Example I at room temperature. It was also found that the composite alloy had a specific stiffness ratio $E/p$ of about $166 \times 10^6$ in. This is about 1.7 times that of pure magnesium. A chart follows illustrating the relationship between the unique magnesium based composite of Example I with that of pure magnesium:

| Material | E, p.s.i. | $E/p$, in. |
|---|---|---|
| BoroMag | $11.3 \times 10^6$ | $166 \times 10^6$ |
| Magnesium | $6.2 \times 10^6$ | $100 \times 10^6$ |

Example I was found to have some ductility; that is, about 12% compression strain without cracking when tested on the Instron Machine at a temperature of about 25° C. and at a rate of deformation of about 0.02 in./min. The above result suggests a tensile ductility of about 2%.

The above method produces a new alloy with an isotropic specific stiffness of at least one and one-half times of any other known magnesium alloy as well as providing an alloy with an acceptable tensile ductility.

What is claimed is:
1. The method of making composite alloy comprising the steps of:
 (a) mixing a first metal powder with a second metal powder to form a mixture;
 (b) cold compacting said mixture;
 (c) hot compacting said cold compacted mixture;
 (d) sintering the hot compacted mixture into a billet and then cooling said billet;
 (e) extruding said billet into a rod;
 (f) warm rolling said rod into thin fragmented sheets of composite material;
 (g) layering said fragmented sheets on top of each other;
 (h) extruding said layered sheets in a direction perpendicular to the layers;
 (i) heating and re-extruding said fragmented sheets to form a rod of said composite;
 (j) re-warm rolling said rod into thin fragmented sheets of composite material;
 (k) re-layering said fragmented sheets on top of each other;
 (l) re-extruding said fragmented layered sheets in a direction perpendicular to the layers to form a final extruded composite alloy.

References Cited
UNITED STATES PATENTS

| 2,934,461 | 4/1960 | Burke | 148—11.5 R |
| 3,166,415 | 1/1965 | Conant | 75—168 R X |
| 3,230,079 | 1/1966 | Conant | 75—168 R |

L. DEWAYNE RUTLEDGE, Primary Examiner

A. J. STEINER, Assistant Examiner

U.S. Cl. X.R.

148—11.5 M; 75—168